United States Patent
Bobade et al.

(10) Patent No.: US 8,483,069 B1
(45) Date of Patent: Jul. 9, 2013

(54) TRACING ETHERNET FRAME DELAY BETWEEN NETWORK DEVICES

(75) Inventors: Vikram Bobade, San Jose, CA (US); Roopa Bayar, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 636 days.

(21) Appl. No.: 12/732,826

(22) Filed: Mar. 26, 2010

Related U.S. Application Data

(60) Provisional application No. 61/294,744, filed on Jan. 13, 2010.

(51) Int. Cl.
*H04J 1/16* (2006.01)
*H04J 3/14* (2006.01)
*H04L 1/00* (2006.01)
*H04L 12/26* (2006.01)

(52) U.S. Cl.
USPC .......................... 370/241; 370/244; 370/245

(58) Field of Classification Search
USPC .............. 370/241, 241.1, 245, 244, 254, 255, 370/259, 260, 229, 230, 230.1, 231, 232, 370/233, 234, 240.1, 242, 247, 252, 253, 370/310, 312, 328, 356, 389, 392, 397, 399, 370/400, 401, 409, 462, 468; 709/223, 224, 709/225, 231, 235, 237, 238, 239, 240
See application file for complete search history.

(56) References Cited

PUBLICATIONS

IEEE Std. 802.3ah-2004, "Part 3: Carrier Sense Multiple Access with Collision Detection (CSMA/CD) Access Method and Physical Layer Specifications, Amendment: Media Access Control Parameters, Physical Layers, and Management Parameters for Subscriber Access Networks", Sep. 7, 2004, 640 pp.
IEEE Std. 802.1ag-2007, IEEE Standard for Local and metropolitan area networks, "Virtual Bridged Local Area Networks, Amendment 5: Connectivity Fault Management", Dec. 17, 2007, 260 pp.
International Telecommunication Union, ITU-T, Y.1731, Series Y: Global Information Infrastructure, Internet Protocol Aspects and Next-Generation Networks—Internet protocol aspects—Operation, administration and maintenance, "OAM functions and mechanisms for Ethernet based networks", Feb. 2008, 82 pp.
RAD's Ethernet Access Solutions, InfoCenter—Ethernet Access Challenges, "Ethernet OAM", retrieved online Dec. 3, 2009 from http://www.ethernetaccess.com/Article/0,6583,37106-Ethernet_OAM, 3 pp.

*Primary Examiner* — Kwang B Yao
*Assistant Examiner* — Adam Duda
(74) *Attorney, Agent, or Firm* — Shumaker & Sieffert, P.A.

(57) ABSTRACT

A method of tracing Ethernet frame delay between network devices is described that includes outputting a delay trace message Ethernet frame to a target MEP network device. The method also includes receiving one or more delay trace response Ethernet frames from one or more MEG intermediate point (MIP) network devices positioned along a network path from the originating MEP network device to the target MEP network device. The method also includes receiving a delay trace response Ethernet frame from the target MEP network device. In some embodiments, the method includes calculating delay associated with portions of the network between each of the network devices using the received responses.

17 Claims, 9 Drawing Sheets

TRACING ETHERNET FRAME DELAY BETWEEN NETWORK DEVICES

This application claims the benefit of U.S. Provisional Application No. 61/294,744, filed Jan. 13, 2010, the entire contents of which are incorporated by reference herein.

TECHNICAL FIELD

The invention relates to computer networks and, more particularly, to fault detection and performance monitoring within a computer network.

BACKGROUND

A computer network is a collection of interconnected computing devices that can exchange data and share resources. The interconnected computing devices may execute myriad different services and communication protocols, including, for example, an Ethernet communications protocol. Ethernet encompasses a family of frame-based computer network technologies that may be used by enterprise-level local area networks (LANs) as well as carrier-class networks and service providers.

A computer network that implements a Layer Two (L2) protocol such as an Ethernet communications protocol may be managed by a service provider that must meet performance parameters set forth in a service level agreement (SLA) that binds the service provider to provide performance guarantees to its customers. Accordingly, the service provider may manage one or more "maintenance points" within an Ethernet-based network, which are network devices that use a set of Operation, Administration and Maintenance (OAM) functions to monitor operation of Ethernet service in the network in order to detect network faults and measure network performance. Service providers may also implement the OAM functions to measure SLA parameters between maintenance points of their Ethernet-based networks. For example, the OAM functionality may be used to track quality of service (QoS) attributes such as availability, frame delay, delay variation ("jitter"), and frame loss on the Ethernet-based network.

SUMMARY

In general, techniques are described for network fault detection and performance management in a Layer Two (L2) network, such as an Ethernet-based network. In particular, systems and methods are provided for computing Ethernet frame transmission delay for each network segment in a path between two maintenance entity group (MEG) end points that are separated by one or more MEG intermediate points. A network segment includes, for example, a portion of the network path between a MEG end point and a MEG intermediate point, or a portion of the network path between two MEG intermediate points. The techniques provide a new Ethernet OAM function, referred to herein as the Ethernet Delay Trace (ETH-DT) function.

The ETH-DT function can be used to obtain information from one or more MEG intermediate points (MIPs) on a path between an originating MEG End Point (MEP) and a target MEP. In some embodiments, the ETH-DT function can be used for fault localization. For example, when a fault (e.g., a link and/or device failure) or a forwarding plane loop occurs, a sequence of MIPs and/or MEP identified using the ETH-DT function will likely be different from an expected sequence. The originating MEP may use information about differences in the sequence to determine a fault location.

In addition, the ETH-DT function can simultaneously be used to measure frame delay and frame delay variation. Ethernet frame delay information and information about the path traversed ETH-DT frames can be gathered with initiation of a single function, rather than having to poll each MEG intermediate point independently. Calculating delay allows a network administrator to identify the network segments that introduce the greatest delay. The delay information can be used to identify inefficient or poorly functioning segments, thereby allowing a network administrator to take corrective action to reduce the delay between MEG entities.

In one embodiment, a method of tracing Ethernet frame delay between network devices includes, with an originating MEP network device, outputting a delay trace message Ethernet frame to a target MEP network device, wherein the delay trace message Ethernet frame indicates an address of the originating MEP and a delay trace message initiation time. The method also includes, with the originating MEP network device, receiving a first delay trace response Ethernet frame from a MIP network device positioned along a network path from the originating MEP network device to the target MEP network device, wherein the delay trace response Ethernet frame is generated in response to the delay trace message Ethernet frame. The first delay trace response Ethernet frame includes a network address of the MIP network device, the delay trace message initiation time, a delay trace message reception time corresponding to a time that the delay trace message Ethernet frame is received by the MIP network device, and a delay trace response time corresponding to a time that the delay trace response Ethernet frame is output toward the originating MEP network device. When the first delay trace response Ethernet frame is received by the originating MEP network device, the originating MEP network device may insert a timestamp that indicates the time at which the first delay trace response Ethernet frame was received by the originating MEP network device. In this manner, the first delay trace response Ethernet frame contains four timestamps when it is given to a delay trace module of the originating MEP network device for delay computation. The method also includes, with the originating MEP network device, receiving a second delay trace response Ethernet frame from the target MEP network device, wherein the second delay trace response Ethernet frame is generated in response to the delay trace message Ethernet frame. The second delay trace response Ethernet frame includes a network address of the target MEP network device, the delay trace message initiation time, a delay trace message reception time corresponding to a time that the delay trace message Ethernet frame is received by the target MEP network device, and a delay trace response time corresponding to a time that the delay trace response Ethernet frame is output toward the originating MEP network device.

In another embodiment, a network device for tracing delay between network devices connected to an Ethernet network includes an interface, a forwarding engine, and a delay trace module. The interface sends and receives Ethernet frames to and from a network between an originating MEP and a target MEP. The forwarding engine receives a delay trace message Ethernet frame and determines whether to forward the delay trace message Ethernet frame to a next hop along a path of the network to a target network device. The delay trace message Ethernet frame includes an address of a network device that originated the delay trace message Ethernet frame and a delay trace message initiation time. The delay trace module generates a delay trace response Ethernet frame upon receiving the delay trace message Ethernet frame. The delay trace response Ethernet frame includes a network address of the network device, the delay trace message initiation time, a delay trace message Ethernet frame reception time corresponding to the time that the delay trace message Ethernet frame is received by the network device, and a delay trace response time corresponding to a time that the delay trace response Ethernet frame is output from the network device toward the originating MEP network device.

When generating the delay trace response Ethernet frame, the delay trace module copies the delay trace message initiation time from the received delay trace message Ethernet frame into the delay trace response Ethernet frame. When the first delay trace response Ethernet frame is received by the originating MEP network device, the originating MEP network device may insert a timestamp that indicates the time at which the first delay trace response Ethernet frame was received by the originating MEP network device. In this manner, the first delay trace response Ethernet frame contains four timestamps when it is given to the delay trace module of the originating MEP network device for delay computation.

In another embodiment, a system for tracing delay between network devices connected to an Ethernet network includes an originating MEG network device, one or more MIPs, and a target MEP device. The originating MEP network device outputs a delay trace message Ethernet frame to the target MEP network device. The delay trace message Ethernet frame indicates an address of the originating MEP and a delay trace message initiation time. The one or more MEG intermediate points (MIPs) receive the delay trace message Ethernet frame; determine whether to forward the delay trace message Ethernet frame to a next hop along a path to the target MEP network device; generate a delay trace response Ethernet frame that includes a network address of the receiving MIP, the delay trace message initiation time, a delay trace message reception time corresponding to the time that the delay trace message Ethernet frame is received by the one or more MIPs, and a delay trace response time corresponding to a time that the delay trace response Ethernet frame is output toward the originating MEP network device, and output the delay trace response Ethernet frame toward the originating device. When generating the delay trace response Ethernet frame, the delay trace message initiation time is copied from the received delay trace message Ethernet frame into the delay trace response Ethernet frame.

In another embodiment, a method of tracing delay between network devices connected to an Ethernet network includes, with a network device, receiving a delay trace message Ethernet frame having an address of an originating network device and a delay trace message initiation time. The method also includes, with the network device, validating the delay trace message Ethernet frame. The method also includes, with the network device, determining whether to forward the delay trace message Ethernet frame to another network device connected to the network that is not the originating network device. In addition, the method includes, with the network device, generating a delay trace response Ethernet frame that includes a network address of the network device, the delay trace message initiation time, a delay trace message Ethernet frame reception time corresponding to a time that the delay trace message Ethernet frame is received by the network device, and a delay trace response time corresponding to a time that the delay trace response Ethernet frame is output toward the originating network device. The method also includes, with the network device, outputting the delay trace response Ethernet frame toward the originating network device.

When generating the delay trace response Ethernet frame, the delay trace message initiation time is copied from the received delay trace message Ethernet frame into the delay trace response Ethernet frame. When the first delay trace response Ethernet frame is received by the originating MEP network device, the originating MEP network device may insert a timestamp that indicates the time at which the first delay trace response Ethernet frame was received by the originating MEP network device. In this manner, the first delay trace response Ethernet frame contains four timestamps when it is given to the delay trace module of the originating MEP network device for delay computation.

In one embodiment, a method of tracing L2 frame delay between network devices includes, with an originating MEP network device, outputting a delay trace message L2 frame to a target MEP network device, wherein the delay trace message L2 frame indicates an address of the originating MEP and a delay trace message initiation time. The method also includes, with the originating MEP network device, receiving a first delay trace response L2 frame from a MIP network device positioned along a network path from the originating MEP network device to the target MEP network device, wherein the delay trace response L2 frame is generated in response to the delay trace message L2 frame. The first delay trace response L2 frame includes a network address of the MIP network device, the delay trace message initiation time, a delay trace message reception time corresponding to a time that the delay trace message L2 frame is received by the MIP network device, and a delay trace response time corresponding to a time that the delay trace response L2 frame is output toward the originating MEP network device. The method also includes, with the originating MEP network device, receiving a second delay trace response L2 frame from the target MEP network device, wherein the second delay trace response L2 frame is generated in response to the delay trace message L2 frame. The second delay trace response L2 frame includes a network address of the target MEP network device, the delay trace message initiation time, a delay trace message reception time corresponding to a time that the delay trace message L2 frame is received by the target MEP network device, and a delay trace response time corresponding to a time that the delay trace response L2 frame is output toward the originating MEP network device.

If the network includes more than one MIP between the originating MEP network device and the target MEP network device, the originating MEP network device will similarly receive corresponding delay trace response L2 frames from the MIPs, which likely will be received prior to the second delay trace response L2 frame received from the target MEP network device. When generating the delay trace response L2 frame, the delay trace message initiation time is copied from the received delay trace message L2 frame into the delay trace response L2 frame. When the first delay trace response L2 frame is received by the originating MEP network device, the originating MEP network device may insert a timestamp that indicates the time at which the first delay trace response L2 frame was received by the originating MEP network device. In this manner, the first delay trace response L2 frame contains four timestamps when it is given to the delay trace module of the originating MEP network device for delay computation.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
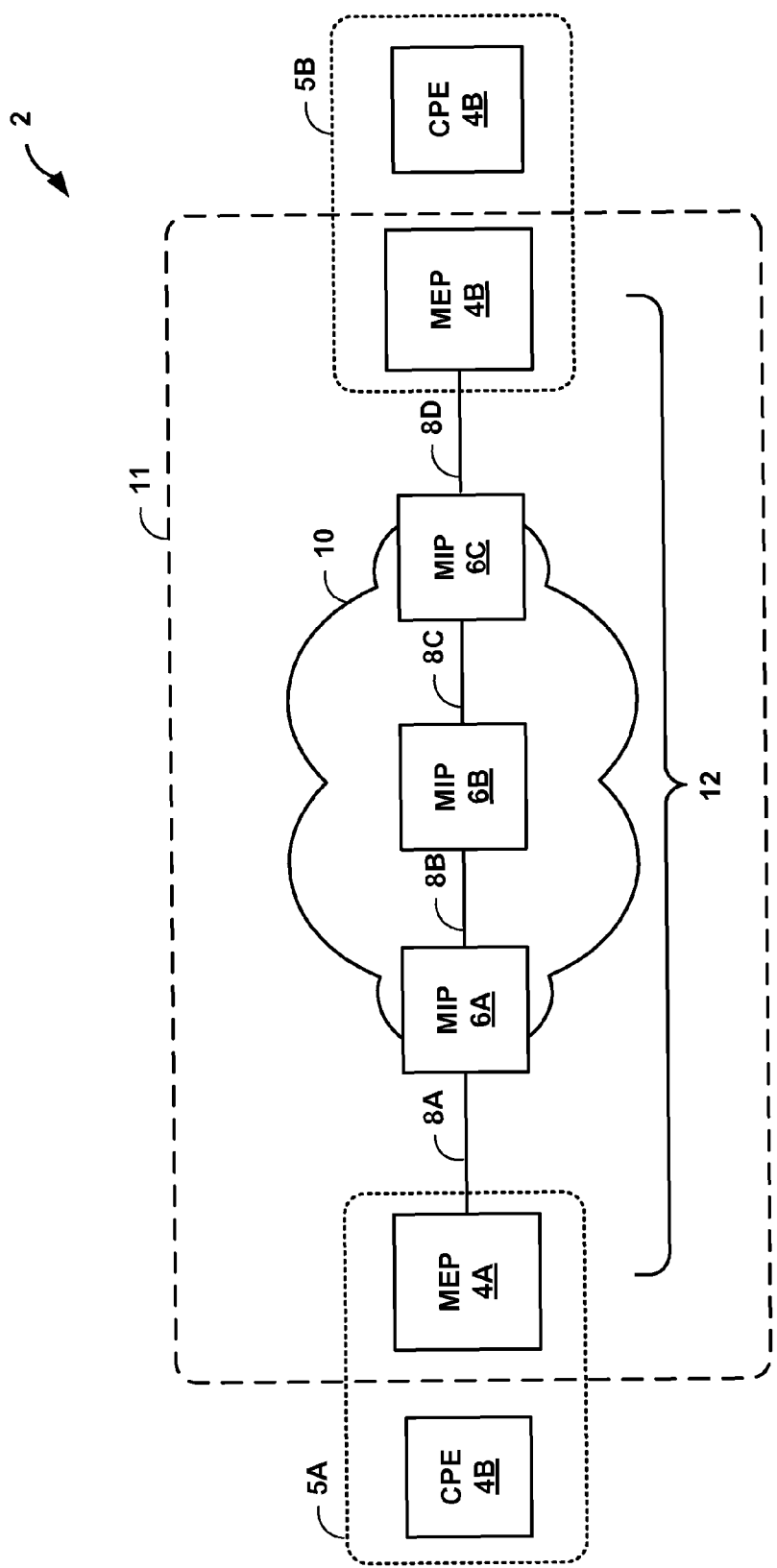
FIG. 1 is a block diagram illustrating an example embodiment of a network having a plurality of maintenance entities, between which delay can be calculated consistent with the principles of the invention.

FIG. 1 is a diagram illustrating an example embodiment of a system 2 that includes devices that are members of a maintenance entity group (MEG) 12. The members of MEG 12 include a first maintenance entity group end point (MEP) 4A, several maintenance entity group intermediate points MIPs 6A-6C ("MIPs 6"), and a second MEP 4B (collectively referred to as maintenance entities ("MEs")). The MEG 12 operates on a Media Access Control (MAC) layer of the system 2 according to an Ethernet communications protocol, and uses mechanisms and Ethernet frame formats (e.g., Ethernet OAM frame formats and syntax) for operating and maintaining the network and service aspects of the MAC layer. The MAC layer is a sub-layer of the Data Link Layer (i.e., layer two) specified in the Open System Interconnection (OSI) reference model. Ethernet is one example of a layer two (L2) protocol. Other example L2 protocols include the Point-to-Point Protocol (PPP), High-Level Data Link Control (HDLC) and Advanced Data Communication Control Protocol (ADCCP) for point-to-point (dual-node) connections. Although described for purposes of example below with respect to Ethernet, the techniques may be applied to other L2 protocols.

Core network 10 may be coupled to one or more networks administered by the same and/or other providers, and may thus form part of a large-scale public network infrastructure, e.g., the Internet. In some embodiments, MEPs 4 may be Ethernet Network Termination Units (E-NTUs) that interconnect a public network with a customer's private equipment. For example, MEPs 4 may be coupled by an Ethernet connection to customer premises equipment (CPEs) (not shown) that are coupled to customer networks (not shown). The customer networks may be viewed as edge networks of the Internet. Core network 10 may provide computing devices within the customer networks with access to the Internet, and may allow the computing devices within the customer networks to communicate with each other.

For example, MEP 4A and MEP 4B of the MEG 12 mark the end points of the MEG 12, and are capable of generating and terminating Ethernet OAM frames for fault management and performance monitoring of Ethernet service. MIPs 6 are intermediate points in the MEG 12, and are capable of intercepting and modifying certain Ethernet OAM frames. The Ethernet OAM frames are distinct from other data flows being transmitted within system 2. The Ethernet OAM frames are added to the aggregate of other data flows, and are subject to the same forwarding treatment as the other data flows being monitored. As one example, the MEG 12 may implement a standard that sets forth one or more service layer protocols that are used to measure service level agreement (SLA) parameters, such as the standard of the International Telecommunications Union—Telecommunications (ITU-T) entitled SERIES Y: GLOBAL INFORMATION INFRASTRUCTURE, INTERNET PROTOCOL ASPECTS AND NEXT-GENERATION NETWORKS, OAM functions and mechanisms for Ethernet based networks, Y.1731, February 2008, the entire content of which is incorporated by reference herein in its entirety.

According to the techniques described herein, certain Ethernet OAM frames, such as a delay trace message (DTM) Ethernet frame and a delay trace response (DTR) Ethernet frame, as described in greater detail below, can be generated, intercepted, and modified by the various MEs in system 2. The delay trace frames DTM and DTR may include timing and address information that is used to calculate Ethernet frame delay associated with each of network segments 8A-8D.

For example, in the embodiment shown in FIG. 1, MEP 4A initiates a DTM frame and sends the DTM frame to the next hop along the path to MEP 4B, i.e., MIP 6A. Upon receiving the DTM frame from MEP 4A, MIP 6A forwards the DTM frame to the next hop along the path to MEP 4B. As described in more detail below, the DTM frame may be forwarded, for example, in hardware of MIP 6A to avoid introducing delay. In response to the reception of the DTM frame, the MIP 6A also generates a DTR frame and sends the DTR frame back to the initiating MEP, MEP 4A.

Similarly, when the MIP 6B receives the forwarded DTM frame, the MIP 6B forwards the DTM frame MEP 4B, and generates a DTR frame in response. In addition, MIP 6B sends the DTR frame toward MEP 4A. MIP 6A receives the DTR frame and forwards it in the forwarding plane toward MEP 4A. This process is repeated until the target MEP of the MEG 12, i.e., MEP 4B, receives the forwarded DTM frame and generates a DTR frame in response.

As described in greater detail below with respect to FIG. 5, the DTM and DTR frames may include network address information and timing information that is unique to each ME on the network 10. The network address and timing information can be used to calculate the relative position of each ME on the network 10, as well as the delay between each network segment 8. For example, upon receiving the DTR frames, the originating MEP, MEP 4A, can calculate the duration between the time that the original DTM message was initiated and the time that the DTR response was received. That delay information can be used to calculate the round-trip frame delay between each network segment 8, where frame delay is defined as the elapsed time between the start of transmission of the first bit of a frame (e.g., a DTM frame) by a source node and the reception of the last bit of a loop backed frame (e.g., a returned DTR frame) by the same source node, when the loop back is performed at the frame's destination node.

The computed delay between each network segment 8 along the path from MEP 4A to MEP 4B allows a network administrator to identify the segment(s) 8 that introduce the greatest delay. The delay information can be used to identify the inefficient or poorly functioning segments 8, thereby allowing a network administrator to take corrective action so that the delay between MEPs meets SLA requirements. Additionally, the DTM and DTR frames allow a network administrator to identify faulty segments 8 within SP network 11 by initiating a single frame, without having to explicitly poll each of the MEs of the network using separate messages. In other words, initiation of a single DTM frame by an originating MEP returns DTR frames (e.g., including address and timing information) from each ME up to and including target MEP 4B, without having to separately initiate multiple frames from the originating MEP.

In some embodiments, a service provider may define an administrative boundary having a plurality of MEs on the same MEG Ethernet demarcation level. The service provider can then implement OAM functions and frames within its administrative boundary and on the specified Ethernet demarcation level. To exist within the MEG, each of the MEs must exist in the same administrative boundary and must be included on the same MEG Ethernet demarcation level. For example, eight MEG demarcation levels may be available to accommodate different network deployment scenarios. When customer, provider, and operator data path flows are not distinguishable within system 2 based on ETH layer encapsulations, the eight MEG levels can be shared amongst them to distinguish between OAM frames belonging to MEGs of customers, providers and operators. Customers, service providers, and operators may each be assigned respective MEG levels. For example, the customer may be assigned MEG levels 7, 6, and 5, while the service provider may be assigned MEG levels 4 and 3, and the operator may be assigned MEG levels 2, 1, and 0. Though eight MEG Levels are available, not all MEG levels need be used. The number of MEG levels used depends on the number of nested MEs, for which the OAM flows are not distinguishable based on ETH layer encapsulation.

Core network 10 may include a variety of network devices other than MIPs 6 (not shown). Although additional network devices are not shown for ease of explanation, it should be understood that system 2 may comprise additional network and/or computing devices such as, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Moreover, although the elements of system 2 are illustrated as being directly coupled, it should be understood that one or more additional network elements may be included along any of segments 8A-8D, such that the network elements of system 2 are not directly coupled.

Figure 2:
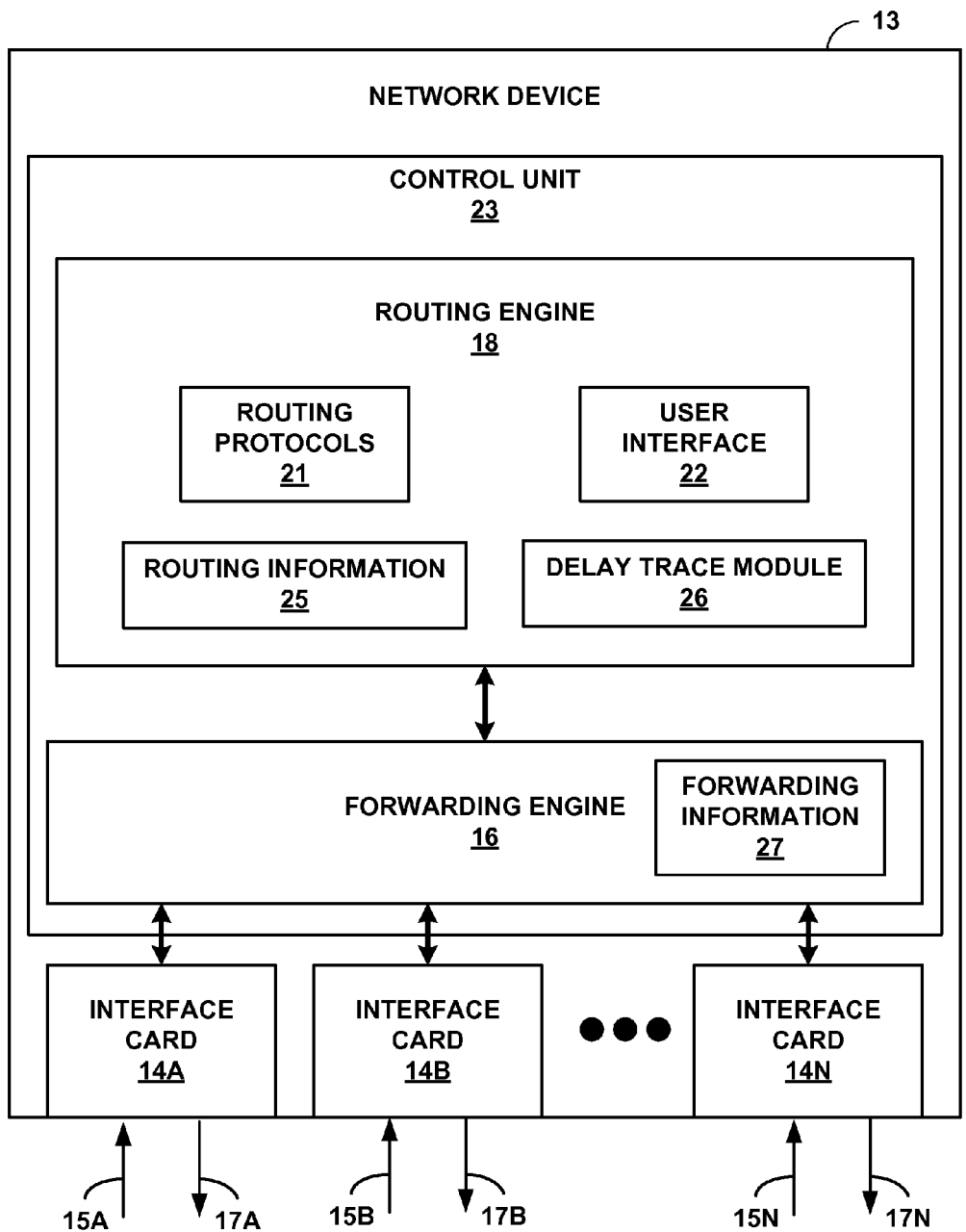
FIG. 2 is a block diagram illustrating an example embodiment of a network device configured to calculate delay between devices in a network consistent with principles of the invention.

FIG. 2 is a block diagram illustrating an exemplary embodiment of a network device 13. In some embodiments, the network device 13 may be a router. The network device 13 may, for example, operate as an MEP or MIP within a MEG, and may be part of a SP network 11 as shown in FIG. 1. For purposes of this disclosure, the network device 13 is described as part of SP network 11 (e.g., as one of the MEs included in the MEG 12). In other embodiments, however, the network device 13 may be connected to an alternative network.

In the illustrated embodiment, network device 13 includes plurality of physical interface cards 14A-14N (collectively, IFCs 14), control unit 23, a forwarding engine 16 and a routing engine 18. In this example, routing engine 18 provides an operating environment for routing protocols 21, a user interface 22, and a delay trace module 26. Routing protocols 21 communicate with other routing devices and maintain routing information 25 to reflect a current network topology. Example routing protocols 21 include the Border Gateway Protocol (BGP), the Intermediate System to Intermediate System protocol (ISIS), the Open Shortest Path First (OSPF) and the Routing Information Protocol (RIP).

A user interface 21 can be used by a network administrator to control certain functions of the routing engine 18. For example, the user interface 21 may be accessed by the network administrator to enter commands that initiate one or more OAM functions for fault management and performance monitoring of a network. In some embodiments, a network administrator may, using the user interface 21, initiate a delay trace function that causes delay trace module 26 to generate DTM frames, as described in greater detail with respect to FIGS. 3-5.

Routing engine 18 generates forwarding information 27 in accordance with routing information 25. Forwarding engine 16 forwards incoming packets received via inbound links 15A-15N to an appropriate next hop via outbound links 17A-17N. Routing information 18 and forwarding information 27 may each be arranged as a radix tree, one or more tables, lists, or other data structures that store the network routes in the form of network addresses, forwarding next hops, or any other manner.

Control unit 23 may be implemented solely in software, or hardware, or may be implemented as combinations of software, hardware, or firmware. For example, control unit 23 may include one or more processors which execute software instructions. For example, control unit 23 may comprise a processor, such as one or more programmable processors, microprocessors, application specific integrated circuits, field programmable gate arrays, digital signal processors, or other equivalent integrated or discrete logic circuitry. Control unit 23 may comprise one or more processors that execute software instructions, such as those used to define a software or computer program, stored to a computer-readable storage medium, such as a storage device (e.g., a disk drive, or an optical drive), or memory (e.g., a Flash memory, random access memory, or RAM) or any other type of volatile or non-volatile memory that stores instructions (e.g., in the form of a computer program or other executable) to cause a programmable processor to perform the techniques described herein. Alternatively, control unit 23 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), one or more Digital Signal Processors (DSPs) or any combination of the foregoing examples of dedicated hardware, for performing the techniques described herein.

Delay trace module 26 can initiate, modify, and terminate OAM frames for fault management and performance monitoring purposes. In some embodiments, delay trace module 26 performs a delay trace function. Briefly, the delay trace function solicits a response from each ME along the path to the target, where the response includes a MAC address of the ME. In this manner, the router 13 learns the identity of each ME along the path. The delay trace function also gathers timing information associated with the reception and transmission of OAM frames to determine the delay associated with transmitting the frames on the network 10. The delay trace function uses the timing information to calculate the delay between each network segment (e.g., the network between each of the individual MEPs and MIPs included in the SP network 11). The delay information can be used, for example, to localize areas of inefficiencies of the SP network 11.

The router 13 may act as an initiating MEP, such as MEP 4A shown in FIG. 1, or as a non-initiating ME, such as MIPs 6C or MEP 4B shown in FIG. 1. The function of the router 13, as well as the function of the delay trace module 26 (e.g., which resides in the router 13), may vary depending on whether the router 13 is designated as an initiating MEP or non-initiating ME of the MEG 12.

When the router 13 acts as an initiating MEP, delay trace module 26 initiates the delay trace function by sending a forward traveling frame, known as a delay trace message (DTM). The DTM frame contains, as described in greater detail below, certain fields for address data, timing data, and other transaction-related data. Router 13 subsequently receives return frames responsive to the DTM frame, known as delay trace reply (DTR) frames, from MEs along the path to MEP 4B. The DTR frames also contain certain fields for address data, timing data, and other transaction-related data. Upon reception of the DTR frames, the router 13 may pass the DTR frames to the delay trace module 26 for processing. For example, the delay trace module 26 may compare various timestamps in a received DTR frame to calculate a frame delay associated with a particular network segment. Specifically, delay trace module 26 may calculate the difference between a time the DTR frame was received at the initiating MEP (timestamp denoted "RxTimeStampb") and a time the corresponding DTM frame was output from the initiating MEP (timestamp denoted "TxTimeStampf"). In one embodiment, from this result, delay trace module 26 may subtract a processing time internal to the MIP or target MEP that received the DTM frame and sent the DTR frame. Delay trace module 26 may calculate the processing time as a time the DTR frame was output from the MIP or target MEP (timestamp denoted "TxTimeStampb") minus a time the corresponding DTM frame was received at the MIP or target MEP (timestamp denoted RxTimeStampf"). Thus, in one embodiment, the frame delay associated with a network segment from an originating MEP to a receiving MIP or target MEP may be calculated as:

Frame Delay=(RxTimeStampb−TxTimeStampf)−
(TxTimeStampb−RxTimeStampf)

When router 13 acts as a non-initiating ME such as one of MIPs 6C or MEP 4B, router 13 receives the DTM frame from the initiating MEP and processes the DTM frame. For example, forwarding engine 16 may forward the DTM frame to the next ME along the network path to the target MEP 4B. The forwarding of the DTM frame may occur entirely within forwarding plane hardware so as not to add any additional processing delay at router 13. The delay trace module 26 of the router 13 may generate a DTR frame for transmission back to the initiating MEP.

The address fields of the DTM frame may include a field for address information related to the initiating MEP and a field for address information related to the target MEP. The timing fields of the DTM frame may include a field for a timestamp associated with the time that the DTM frame is transmitted from the MEP, and a field for a timestamp associated with the time that the DTM frame is received by another ME of SP network 11. The timing fields may also include a reserved field for a timestamp associated with the time that a receiving ME returns a DTR frame to the initiating MEP, and a reserved field for a timestamp associated with the time that the initiating MEP receives the return DTR frame.

In addition to the address and timing fields, the DTM frame also includes fields for transaction-related data. For example, the DTM frame may include a transaction identifier, which delay trace module 26 populates with a unique transaction number associated with the DTM frame. Delay trace module 26 uses the transaction number, for example, to validate the DTM frame upon receipt. The DTM frame may also include a forwarding termination field. Delay trace module 26 may use the forwarding termination field to identify when the DTM frame no longer needs to be forwarded (e.g., when the target MEP receives the forwarded DTM frame). The DTM frame may also include one or more type-length-value (TLV) fields. For example, the DTM frame may include an LTM egress identifier TLV, which delay trace module 26 populates with information that identifies the network element initiating the DTM frame.

The DTR frame likewise includes certain fields for timing data and other transaction-related data. For example, the timing fields of the DTR frame may include a field for a timestamp associated with the time that the corresponding DTM frame was transmitted from the initiating MEP, and a field for a timestamp associated with the time that the corresponding DTM frame was received by the ME that is generating the DTR frame. Delay trace module 26 of the receiving ME may copy the values of these timestamps from the corresponding DTM frame when generating the DTR frame. The timing fields may also include a field for a timestamp associated with the time that the receiving ME outputs the DTR frame to the initiating MEP, and a field for a timestamp associated with the time that the initiating MEP receives the return DTR frame.

In addition to the address and timing fields, the DTR frame also includes fields for transaction-related data. For example, the DTR frame may include a transaction identifier, which delay trace module 26 may copy from the DTM frame. The DTR frame may also include the forwarding termination field. In addition, the DTR frame may include one or more identification fields. For example, the DTR frame may include a last egress identifier TLV, which delay trace module 26 populates with information that identifies the initiating ME, or the ME that forwarded the DTM frame to which the DTR frame is responding. The DTR frame may also include a next egress identifier TLV, which delay trace module 26 populates with information that identifies the ME that transmitted the DTR frame.

Figure 3A:
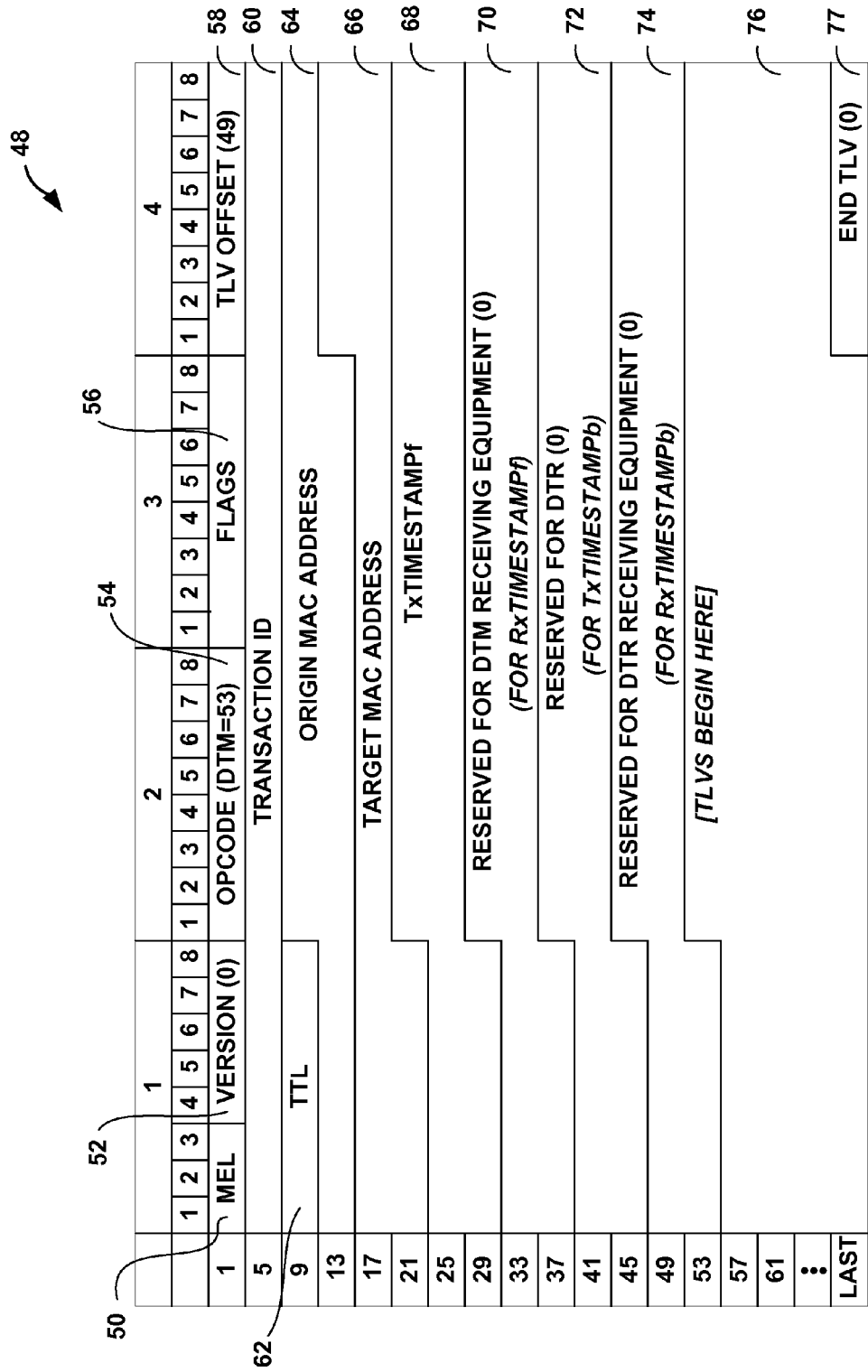
FIG. 3A is a block diagram illustrating an example embodiment of a delay trace message (DTM) protocol data unit (PDU) configured to carry information that can be used to calculate delay between maintenance points of a network consistent with principles of the invention.

FIG. 3A illustrates an exemplary delay trace DTM OAM protocol data unit (PDU) 48 that can be inserted in a DTM frame generated by delay trace module 26. As illustrated in FIG. 3A, DTM PDU 48 includes a MEG level ("MEL") field 50, a version field 52, an OpCode field 54, a flags field 56, a TLV offset field 58, a transaction field 60, a TTL field 62, an OriginMAC field 64, a TargetMAC field 66, a TxTimeStampf field 68, and fields reserved for additional address and timestamp data including an RxTimeStampf field 70, a TxTimeStampb field 72, and a RxTimeStampb field 74. DTM PDU 48 also includes a TLV field 76 and an end TLV field 77.

MEG level field 50 is a 3-bit field containing an integer value that identifies a MEG level of DTM PDU 48. The value of MEG level field 50 ranges from 0 to 7. Version field 52 is a 5-bit field containing an integer value that identifies the OAM protocol version, e.g., version 0. OpCode field 54 is a 1-octet field containing an OpCode that identifies an OAM PDU type. In this example, OpCode field 54 includes an OpCode identifying the OAM PDU as a DTM PDU by including an OpCode value of 53. OpCode field 54 is used by a ME receiving the DTM frame containing DTM PDU 48 to identify the remaining content of DTM PDU 48.

Figure 3B:
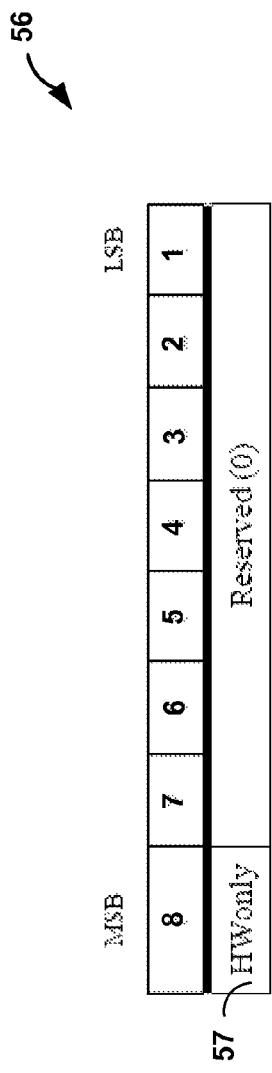
FIG. 3B is a block diagram illustrating an example flags field in further detail.

Flags field 56 is an 8-bit field. Use of the bits in flags field 56 is dependent on the OAM PDU type. FIG. 3B is a block diagram illustrating an example flags field 56 in further detail. In the DTM PDU, as shown in FIG. 3B, the flags format includes a hardware only field 57 in which bit eight of the flags field 56 is set to a value of one. The value of one indicates that only MAC addresses learned in active data forwarding tables are to be used to forward the DTM to the next hop. When forwarding a received DTM, the value of the HWonly field of the forwarded DTM is copied from the corresponding value in the incoming DTM frame's HWonly field 57.

As shown in FIG. 3A, the TLV offset field 58 is a 1-octet field containing the offset to the first TLV in an OAM PDU relative to the TLV Offset field. The value of TLV offset field 58 is associated with an OAM PDU type. For example, when the value of TLV offset field 58 is 0, the TLV offset field 58 points to the first octet following the TLV Offset field. In the example of the DTM PDU, TLV offset field 58 has a value of 49.

Other example information elements which may not be present in OAM PDUs but may be conveyed in frames carrying OAM PDUs include a priority information element that identifies the priority of a specific OAM frame, and a drop eligibility information element that identifies the drop eligibility of a specific OAM frame.

The transaction ID field 60 is a 4-octet field that contains a transaction identifier for the DTM. When delay trace module 26 initiates the delay trace function, delay trace module 26 populates the transaction field 60 with a unique transaction ID number. The transaction ID number can be used, for example, to validate the delay trace function. When a DTM frame is received by an ME, delay trace module 26 of the receiving ME will copy the transaction ID number to a corresponding DTR PDU generated by the receiving ME (e.g., described below with respect to FIG. 4).

The time to live (TTL) field 62 is a 1-octet field that indicates whether a DTM should be terminated by the receiver, i.e., not forwarded by the receiver. Delay trace module 26 of a ME that receives the DTM decrements the received TTL value by one and copies the decremented field into the TTL field of the DTR PDU, as well as into the DTM that it forwards to the next ME. When an MIP receives a DTM PDU with TTL=1, the MIP does not forward the DTM PDU to the next ME, but instead discards the DTM PDU.

The OriginMAC field 64 is a 6-octet field used to carry the MAC address of the originating MEP. Delay trace module 26 of a receiving MIP copies the value of OriginMAC field 64 into the DTM that MIP forwards towards the next ME. In addition, delay trace module 26 uses OriginMAC field 64 when generating DTR frames to be returned to the originating MEP. The TargetMAC field 66 is a 6-octet field used to carry a MAC address of the targeted end point (e.g., MEP 4B). Delay trace module 26 of a receiving MIP copies this field into the DTM that the MIP forwards towards the next ME.

The timestamp fields 68, 70, 72, and 74 are populated with timestamps throughout the delay trace function. For example, an originating MEP populates the TxTimeStampf field 68 with a timestamp indicating a time at which the DTM frame containing DTM PDU 48 is sent from the originating MEP. When a ME receives the DTM frame, TxTimeStampf field 68 is the only timestamp field that is populated. When the DTM frame containing DTM PDU 48 is received by an ME, delay trace module 26 of the receiving ME populates RxTimeStampf field 70 with a timestamp indicating a time at which the DTM frame is received by the ME. When delay trace module 26 of the receiving ME generates a corresponding DTR frame, delay trace module 26 populates TxTimeStampb field 72 with a timestamp indicating a time at which a DTR frame is sent toward the originating MEP. When the originating MEP receives the DTR frame, the originating MEP populates RxTimeStampb field 74 with a timestamp indicating a time at which the DTR frame is received by the originating MEP.

Delay trace module 26 may populate TLV field 76 with identification data. For example, delay trace module 26 may populate TLV field 76 with a DTM egress identifier TLV that identifies the ME initiating the DTM frame. Delay trace module 26 may also include other TLVs in TLV field 76. End TLV field 77 may include an all-zeroes octet value.

Figure 3C:
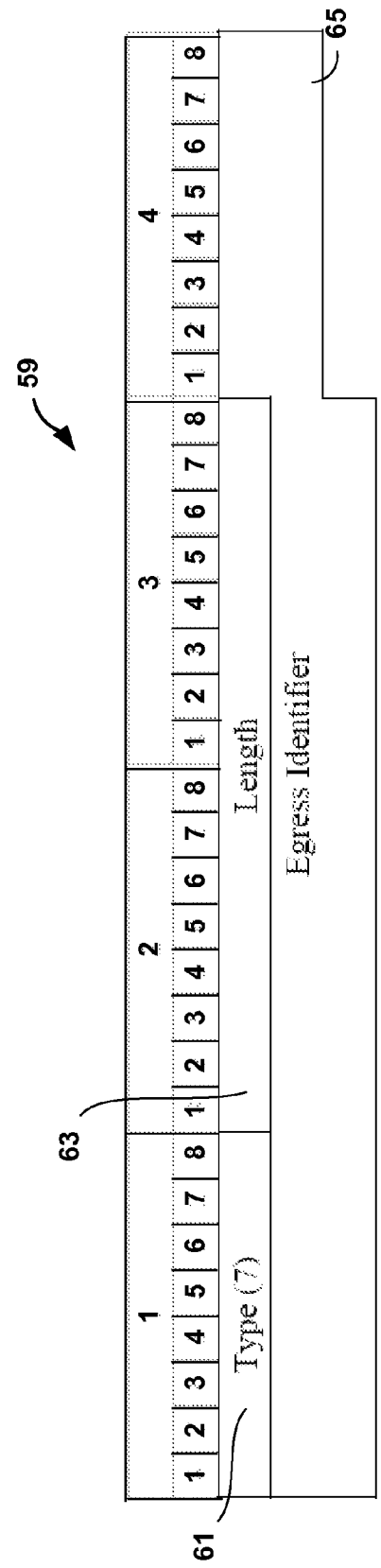
FIG. 3C is a block diagram illustrating an example DTM egress identifier TLV format in further detail.

FIG. 3C is a block diagram illustrating an example DTM egress identifier TLV format 59 in further detail. As shown in FIG. 3C, DTM egress identifier TLV format 59 includes a type field 61, a length field 63, and an egress identifier field 65. Type field 61 identifies the TLV type. The value for this TLV type corresponds to a DTM egress identifier. Length field 63 identifies the size, in octets, of the value field containing the egress identifier. In one example, the length field 63 may be set to eight. Egress identifier field 65 identifies the MEP that initiated the DTM frame or an Ethernet delay trace (referred to as "ETH-DT") responder that has relayed a modified DTM frame. Octets 4 and 5 may be ZEROs while the remaining six octets 6-11 may contain a 48-bit IEEE MAC address unique to the network element where the MEP or ETH-DT responder resides.

Figure 4A:
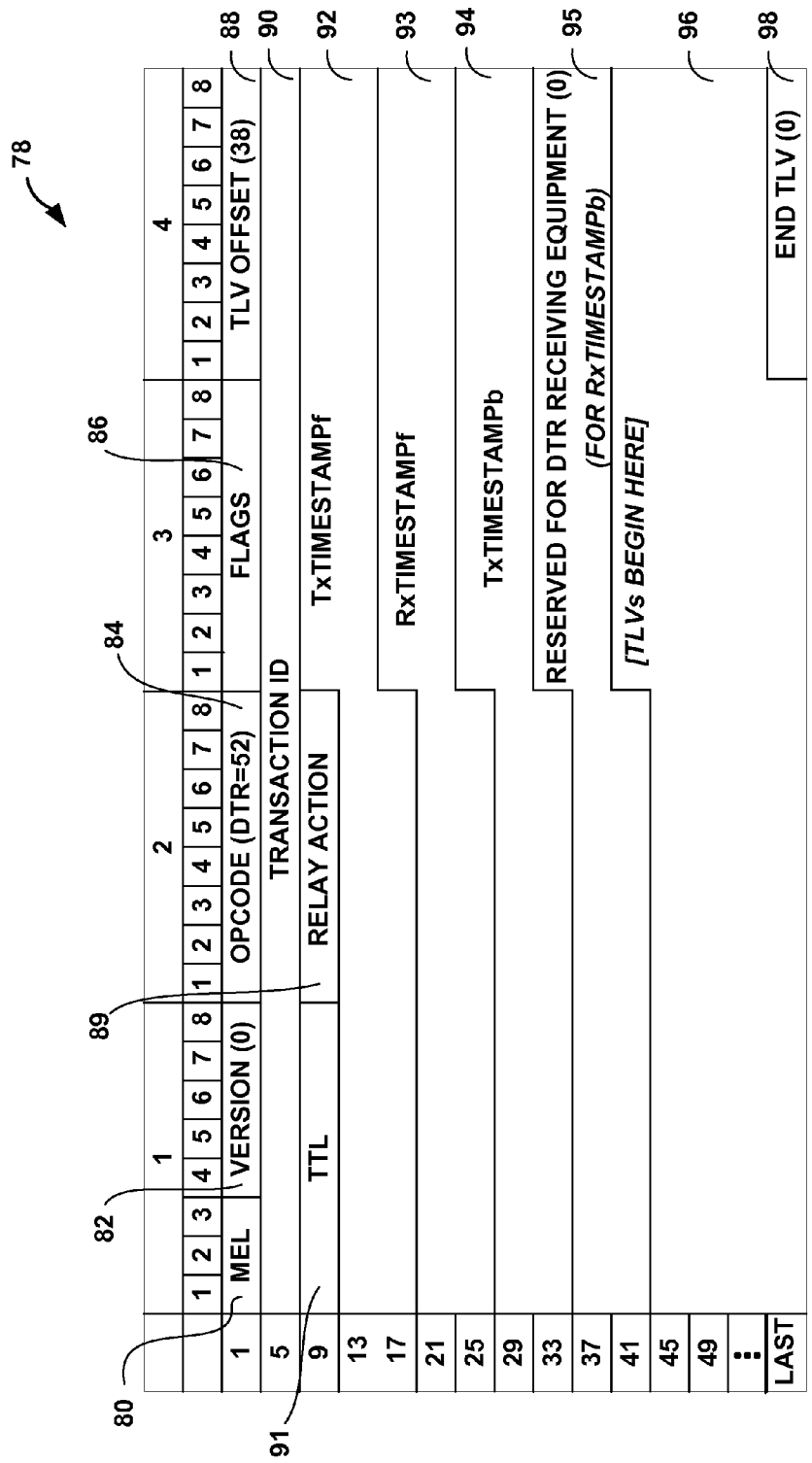
FIG. 4A is a block diagram illustrating another example embodiment of a delay trace response (DTR) protocol data unit (PDU) configured to carry information that can be used to calculate delay between maintenance points of a network consistent with principles of the invention.

FIG. 4A illustrates an exemplary delay trace DTR PDU 78 that can be inserted in a DTR frame generated by delay trace module 26. Like the DTM PDU 48, the DTR PDU also includes a MEG level ("MEL") field 80, a version field 82, an OpCode field 84, a flags field 86, a TLV offset field 88, and a transaction ID field 90. OpCode field 84 includes a value of 52 for a DTR PDU. In addition, DTR PDU 78 includes a TTL field 91, a Relay Action field 89, a TxTimeStampf field 92, an RxTimeStampf field 93, a TxTimeStampf field 94, a TxTimeStampb field 95, a TLV field 96, and an end TLV field 98.

In this example, OpCode field 84 includes an OpCode identifying the OAM PDU as a DTR PDU by including an OpCode value of 52. OpCode field 84 is used by an ME that receives the DTR frame containing DTR PDU 78 to identify the remaining content of DTR PDU 78. In the example of the DTR PDU 78, TLV offset field 88 has a value of 38.

Figure 4B:
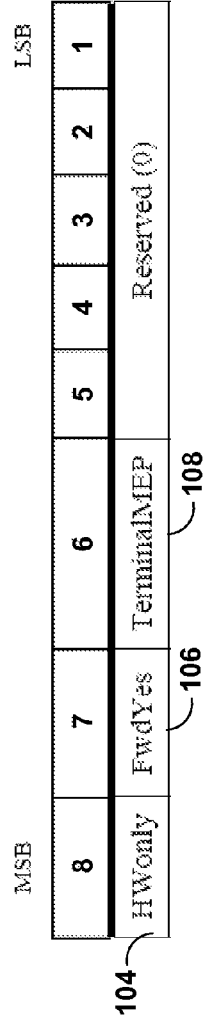
FIG. 4B is a block diagram illustrating an example flags format of DTR PDU in further detail.

FIG. 4B is a block diagram illustrating an example flags format 86 of DTR PDU 78 in further detail. In the DTR PDU 78, as shown in FIG. 4B, the flags format 86 includes a hardware only field 104 in which bit eight is copied from the value of the flags field 56 of the incoming DTM PDU 48 (see FIG. 3B), i.e., a value of one. Flags format 86 also includes a FwdYes field 106, in which delay trace module 26 sets bit seven to one if delay trace module 26 has relayed a modified DTM frame. The delay trace module 26 may alternatively set bit seven to zero if delay trace module 26 has not relayed a DTM frame. Flags format 86 also includes a TerminalMEP field 108 in which delay trace module 26 sets bit six to one if a Reply Egress TLV (or Reply Ingress TLV, if the Reply Egress TLV is not present) is a MEP, or sets bit six to zero otherwise.

Delay trace module 26 populates some of fields in the DTR PDU 78 are using data from the DTM PDU 48. For example, delay trace module 26 copies into MEL field 80 the value from the received DTM PDU 48. Transaction ID field 90 is a 4-octet field that is populated with the unique transaction number carried by the DTM PDU 48. TTL field 91 is a 1-octet field to which delay trace module 26 copies the value from the DTM PDU 48 decremented by one. Relay Action field 89 is a 1-octet field that is reserved for use by IEEE 802.1.

In addition, delay trace module 26 populates timestamp fields 92-94 by copying the values of the corresponding fields 68-72 from the DTM PDU 48. For example, delay trace module 26 populates TxTimeStampf field 92 with the timestamp of the TxTimeStampf field 68 from the DTM PDU 48 that indicates a time at which a DTM frame is sent from an originating MEP. Delay trace module 26 populates RxTimeStampf field 93 with the timestamp of the RxTimeSTampf field 70 from the DTM PDU 48 that indicates a time at which the DTM frame is received by the router 13. When delay trace module 26 of a non-initiating ME generates a corresponding DTR frame, delay trace module 26 populates TxTimeStampb field 72 with a timestamp indicating a time at which a DTR frame output from network device 13 in the backward direction toward the originating MEP. RxTimeStampb field 95 is reserved for a timestamp that indicates a time at which the DTR frame is received by the originating MEP.

The TLV field 96 may be populated with identification data. For example, the TLV field 96 may be populated with a last egress identifier, which identifies the initiating ME, or the ME that forwarded the DTM frame to which the DTR frame is responding. The TLV field 96 may also be populated with a next egress identifier, which identifies the ME that transmitted the DTR frame.

Figure 4C:
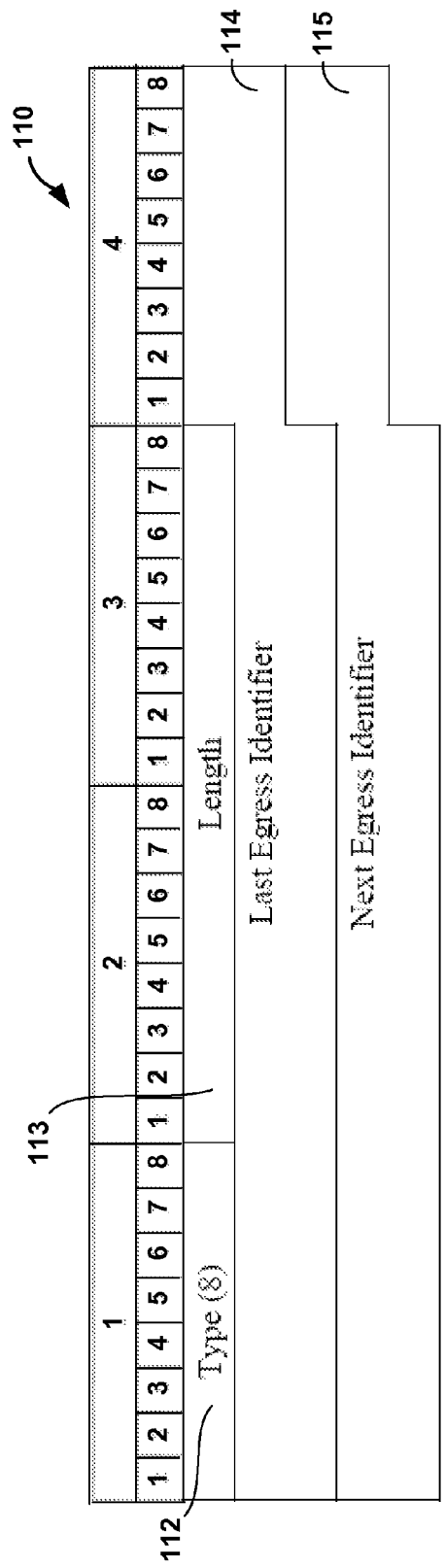
FIG. 4C is a block diagram illustrating an example DTR Egress Identifier TLV format in further detail.

For example, TLV field 96 may include a DTR Egress Identifier TLV format. FIG. 4C is a block diagram illustrating an example DTR Egress Identifier TLV format 110 in further detail. As shown in FIG. 4C, DTR Egress Identifier TLV format 110 includes a type field 112, a length field 113, a last egress identifier field 114, and a next egress identifier field 115. Type field 112 identifies the TLV type. The value for this TLV type corresponds to a DTR Egress Identifier. Length field 63 identifies the size, in octets, of the value field containing the Last Egress Identifier and Next Egress Identifier. In one example, length field 63 may be set to 16. Last Egress Identifier field 114 identifies the MEP that initiated the DTM frame or the ETH-DT responder relaying a DTM frame to which this DTR frame is the response. This field may be the same as the Egress Identifier in the DTM Egress Identifier TLV 59 of the incoming DTM frame.

Next Egress Identifier field 115 identifies the ETH-DT responder that transmitted the DTR frame, and which can relay a modified DTM frame to the next hop. If the FwdYes field 106 of Flags field 86 has a value of zero, the contents of Next Egress Identifier field 115 are undefined, and ignored by the DTR frame receiver. When FwdYes field 106 of Flags field 86 has a value of one, Next Egress Identifier field 115 is not undefined, Octets 12 and 13 are zeros while the remaining six Octets 14-19 contain a 48-bit IEEE MAC address unique to the network element where the ETH-DT Responder resides.

Figure 4D:
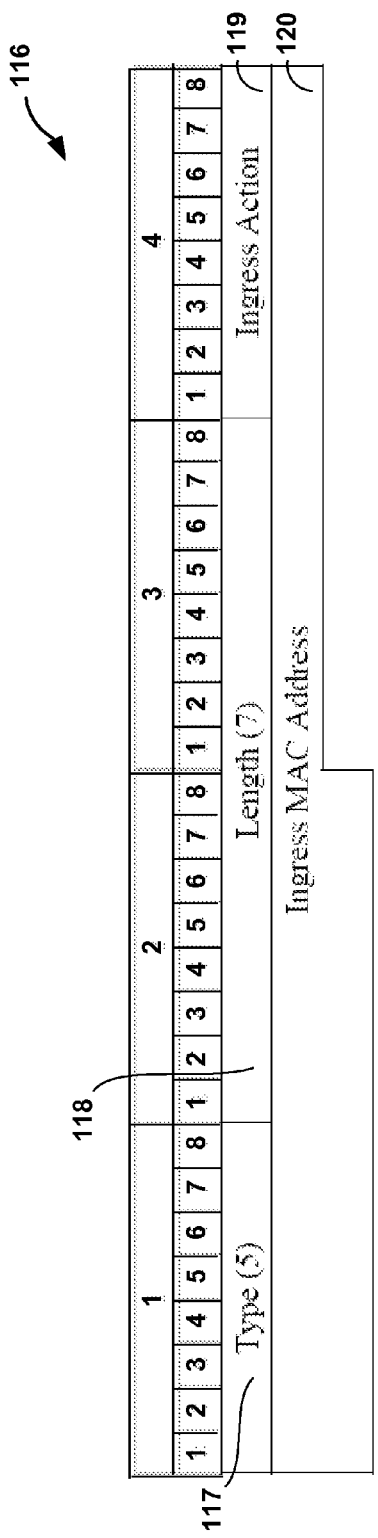
FIG. 4D is a block diagram illustrating an example DTR Reply Ingress TLV format in further detail.

TLV field 96 may include a DTR Reply Ingress TLV format. FIG. 4D is a block diagram illustrating an example DTR Reply Ingress TLV format 116 in further detail. As shown in FIG. 4D, DTR Reply Ingress TLV format 116 includes a type field 117, a length field 118, an ingress action field 119, and an ingress MAC address field 120. Type field 117 identifies the TLV type. The value for this TLV type corresponds to Reply Ingress. Length field 118 identifies the size, in octets, of the value field containing the Reply Ingress. In one example, this may be set to seven. Ingress Action field 119 is a 1-octet field reserved for definition by IEEE 802.1. Ingress MAC Address field 120 is a 6-octet field reserved for definition by IEEE 802.1.

Figure 4E:
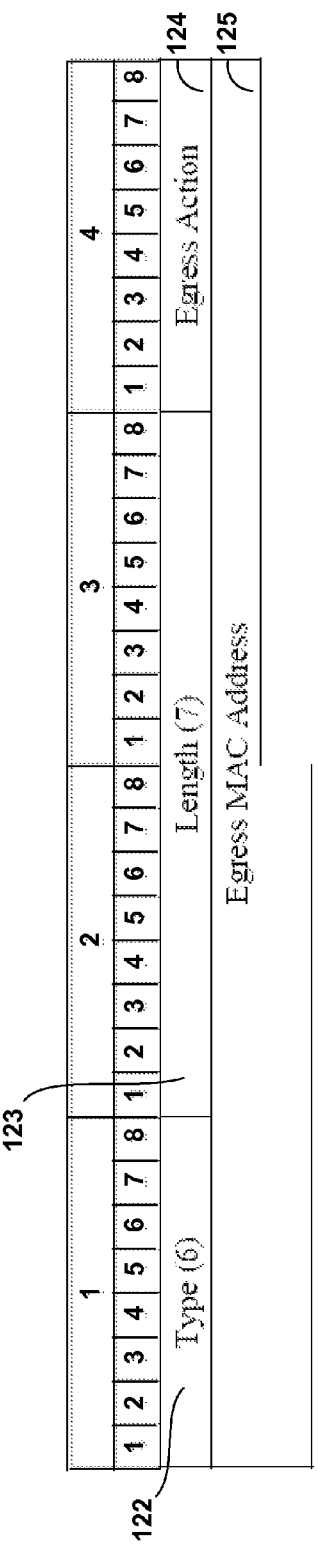
FIG. 4E is a block diagram illustrating an example DTR Reply Egress TLV format in further detail.

TLV field 96 may include a DTR Reply Egress TLV format. FIG. 4E is a block diagram illustrating an example DTR Reply Egress TLV format 120 in further detail. As shown in FIG. 4E, DTR Reply Egress TLV format 120 includes a type field 122, a length field 123, an egress action field 124, and an egress MAC address field 125. Type field 122 identifies the TLV type. The value for this TLV type corresponds to a Reply Egress. Length field 123 identifies the size, in octets, of the value field containing the Reply Egress. In one example, the length field 123 may be set to seven. Egress Action field 119 is a 1-octet field reserved for definition by IEEE 802.1. Egress MAC Address field 125 is a 6-octet field reserved for definition by IEEE 802.1.

Figure 5:
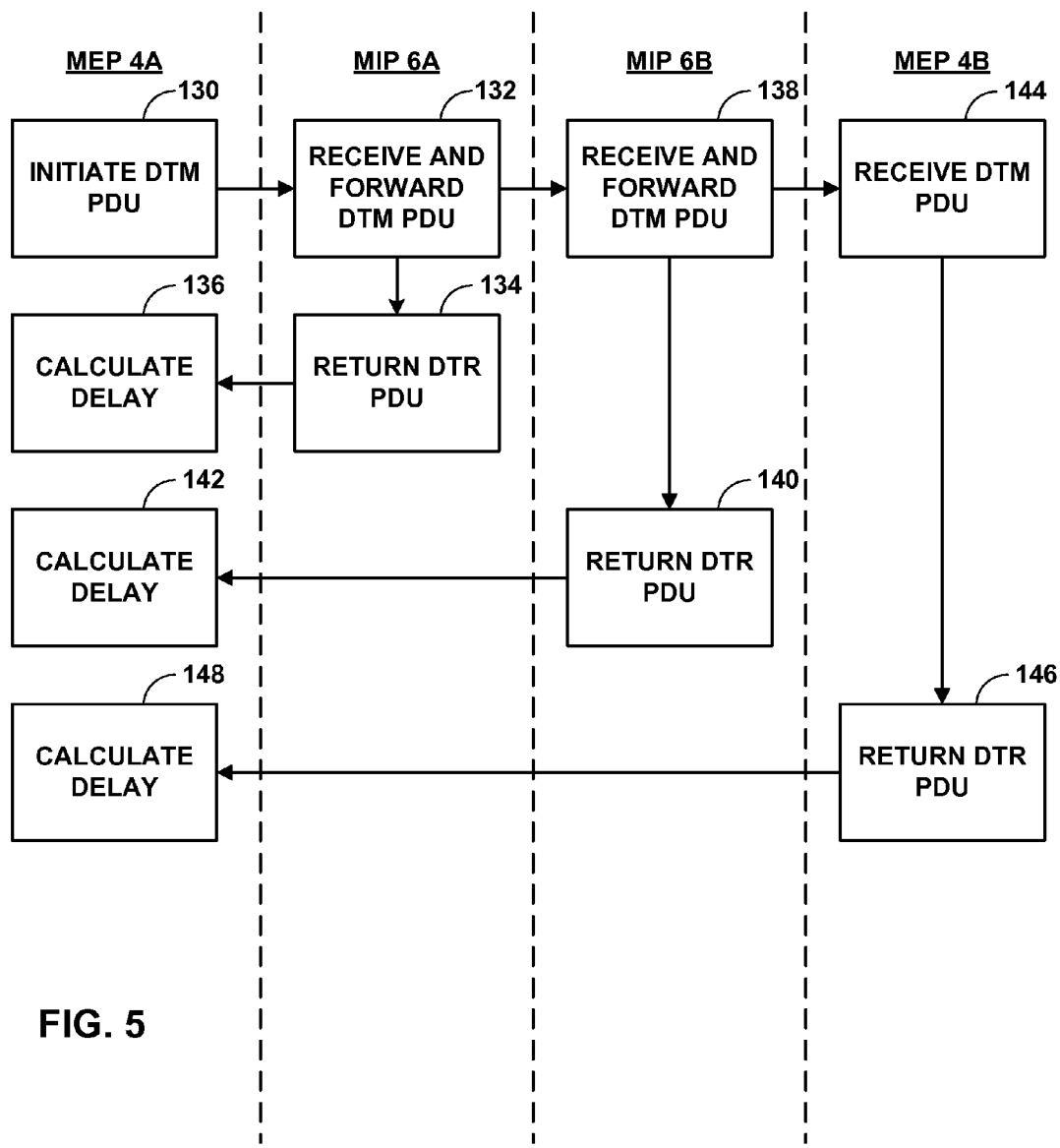
FIG. 5 is a flowchart illustrating example operation of devices in a network in calculating delay between maintenance points of a network consistent with principles of the invention.

FIG. 5 is a flowchart illustrating an example operation of the Ethernet delay trace function (e.g., ETH-DT) implemented by devices of system 2 (FIG. 1). The ETH-DT function can be used to obtain information from one or more MIPs between the originating MEP and the target MEP (or target MIP, if a MIP is targeted instead of a MEP). In some embodiments, the ETH-DT function can be used for fault localization. For example, when a fault (e.g., a link and/or device failure) or a forwarding plane loop occurs, the sequence of MIPs and/or MEP will likely be different from an expected sequence. The originating MEP may use the differences in the sequence to determine a fault location. In addition, the ETH-DT function can simultaneously be used to measure frame delay and frame delay variation for every segment (e.g., portion of network between an MEP and MIP or between two MIPs) in the network path.

In the example of FIG. 5, originating MEP 4A initiates the Ethernet delay trace function by sending a DTM frame to the next hop along the path to MEP 4B, that is, to MIP 6A (130). MEP 4A may be configured to initiate the ETH-DT function on an on-demand basis (e.g., as initiated by a network administrator) or on a periodic basis. The DTM frame includes a DTM PDU such as DTM PDU 48 (FIG. 3A). The DTM PDU includes, among other things, a MAC address of MEP 4A, a target MAC address of MEP 4B, a first timestamp corresponding to the time that the DTM frame was transmitted by MEP 4A (e.g., TxTimestampf), and a unique transaction ID number. The DTM PDU also includes an OpCode field that a receiving ME uses to identify the contents of the PDU and a MEL field that the receiving ME looks at to determine whether the DTM frame is associated with the MEG Level of which the receiving ME is a member.

After transmitting the initial DTM frame, MEP 4A expects to receive a reply frame (e.g., a DTR frame) from each ME along a network path to the destination MEP within a specified time. In some embodiments, the originating MEP 4A expects to receive the return DTR frames from each connected ME within a time period, e.g., within five seconds from the transmission of the initial DTM frame. Accordingly, MEP 4A may retain the unique transaction number of each DTM in memory for at least five seconds after the DTM frame is transmitted. If MEP 4A does not receive a response DTR frame with the same transaction number within the specified time period, MEP 4A may remove the transaction ID number from memory and may subsequently re-use the transaction ID number. MEP 4A may use a different transaction ID number for every DTM frame, and in some embodiments, MEP 4A may not repeat a transaction ID number within one minute.

The MIP 6A receives the DTM frame, validates the DTM frame, updates the DTM frame with address and transaction information, and forwards the DTM frame to the next MIP on the network, MIP 6B (132). The operation of an ME upon receiving the DTM frame is explained in further detail below with respect to FIG. 6. In some embodiments, MIP 6A receives and forwards the DTM frame via hardware in the forwarding engine 16. Using forwarding hardware of MIP 6A may minimize delay in forwarding the DTM frame. In other embodiments, however, the forwarded DTM frame may also be processed in upper layer software before being forwarded. MIP 6A may also apply a second timestamp (e.g., RxTimestampf) corresponding to the time that the DTM frame is received by the MIP 6A in hardware or software.

In addition to forwarding the original DTM frame to the next MIP on the network, MIP 6A generates a DTR frame that includes timestamp and address information (see, for example, the description of the DTR PDU illustrated in FIGS. 4A-4E). The MIP 6A may copy some of the data from the DTM frame into the DTR frame. For example, the DTR frame may include the same MEL value, version number, and transaction ID as the DTM frame. In addition, the MIP 6A may copy the first and second timestamps from the DTM frame (e.g., TxTimestampf and RxTimestampf) into the DTR frame.

The DTR frame may also contain a DTR egress identifier that identifies the source and destination of the DTM that triggered transmission of the DTR frame. The DTR egress identifier also contains a "next" egress identifier that identifies the MEP or MIP that transmitted the DTR frame.

Just prior to being sent toward the originating MEP 4A, the MIP 6A applies a third timestamp (e.g., TxTimestampb). The internal processing time associated with MIP 6A processing the DTM frame and generating the DTR frame can be calculated using the second and third timestamps. For example, subtracting the second timestamp (e.g., RxTimeStampf; applied when the DTM frame is received by MIP 6A) from the third timestamp (e.g., TxTimeStampb; applied just prior to sending the DTR frame toward the originating MEP 4A) provides a processing duration.

MIP 6A then returns the DTR frame to the originating MEP 4A (134). Upon receiving the DTR frame, MEP 4A applies a fourth timestamp (e.g., RxTimestampb) corresponding to the time that the DTR frame is received by MEP 4A. The originating MEP 4A uses the received DTR frame to calculate the delay associated with the network segment between MEP 4A and MIP 6A (136).

In some embodiments, MEP 4A performs a two-way delay calculation. For example, the originating MEP 4A calculates the difference between the fourth timestamp (RxTimestampb), or the time the DTR frame was received at the initiating MEP 4A, and the first timestamp (TxTimestampf), or the time that the DTM frame was sent from the initiating MEP 4A. In one embodiment, from this result, the MEP 4A may subtract the processing time internal to MIP 6A, calculated as described above. Accordingly, the frame delay associated with the network segment between originating MEP 4A and MIP 6A is calculated as:

Frame Delay=(RxTimeStampb−TxTimeStampf)−(TxTimeStampb−RxTimeStampf)

This delay computation is completed for every ME that is connected in the network path between the originating MEP, MEP 4A and the endpoint of the on the MEG, MEP 4B. For example, after MIP 6A forwards the DTM frame to MIP 6B, MIP 6B receives the DTM frame and forwards the DTM frame to the next MIP on the network, or in the embodiment illustrated in FIG. 5, MEP 4B (138). In addition to forwarding the original DTM frame to MEP 4B, MIP 6B generates a DTR frame that includes timestamp and address information, and returns the DTR frame to the originating MEP 4A (140).

Upon receiving the DTR frames, the originating MEP 4A maintains a total delay value, as well as calculates the delay associated with each segment. For example, the originating MEP 4A uses the DTR frame received from MIP 6B to calculate the total delay between MEP 4A and MIP 6B (142). The originating MEP 4A can then also calculate the delay associated with the network segment between MIP 6A and MIP 6B by subtracting the delay associated with the network segment between MEP 4A and MIP 6B by the delay associated with the network segment between MEP 4A and MIP 6A. In this way, MEP 4A can calculate the delay associated with any segment in the network path after receiving the DTR frames.

After MIP 6B forwards the DTM frame to MEP 4B, MEP 4B receives the DTM frame (144). In some embodiments, MEP 4B recognizes that MEP 4B is an end point on the network and terminates the DTM frame, i.e., does not forward the DTM frame. MEP 4B also generates a DTR frame that includes timestamp and address information, and returns the DTR frame to the originating MEP 4A (146). The originating MEP 4A uses the DTR frame to calculate the delay associated with the network segment between MIP 6B and MEP 4B (148). For example, MEP 4A can calculate the delay associated with the network segment MIP 6B and MEP 4B by subtracting the delay associated with the network segment between MEP 4A and MIP 6B from the delay associated with the network segment between MEP 4A and MEP 4B. For purposes of example, the embodiment illustrated in FIG. 5 includes two MIPs (e.g., MIP 6A and MIP 6B). However, the number of MIPs in the network may be greater or fewer, depending on the size of the network.

Figure 6:
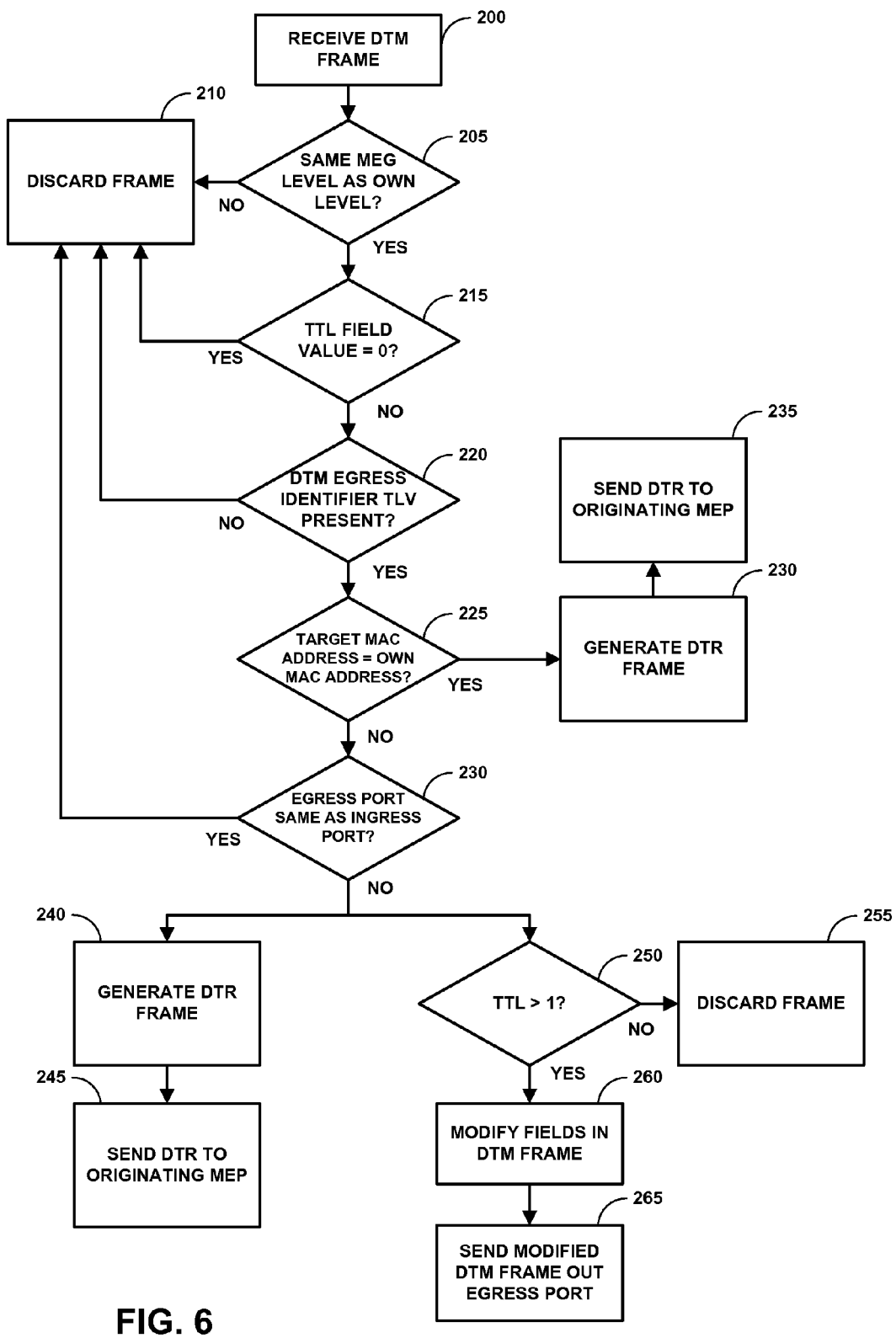
FIG. 6 is a flowchart illustrating example operation of a ME in processing a DTM frame, according to one embodiment of the invention.

FIG. 6 is a flowchart illustrating example processing of a DTM frame, according to one embodiment of the invention. For purposes of this disclosure, the process shown in FIG. 6 is described as being carried out by the network device 13 (see FIG. 2) that is connected to the network 10 (see FIG. 1). In other embodiments, however, the process shown in FIG. 6 may be carried out by a variety of other network devices that are connected to a variety of other network configurations.

As shown in FIG. 6, an ME (e.g., such as MEP 4B or one of MIPs 6A-6C) receives a DTM frame (200) in a forwarding plane of the ME and applies a timestamp that corresponds to the time at which the DTM frame is received. In addition, forwarding engine 16 may forwards the DTM frame to delay trace module 26, where delay trace module 26 verifies that the ME that is receiving the DTM frame is on the same MEG level as the ME that transmitted the DTM frame by examining MEL field 50 of the DTM frame (see FIG. 3A) (205). If the MEG level of the received DTM frame does not correspond to the MEG level of network device 13, the delay trace module 26 discards the DTM frame (210). In some embodiments, the verification of MEG level may be performed in hardware, e.g., prior to forwarding the DTM frame.

After verifying the MEG level, the delay trace module 26 verifies that the TTL field 62 value is greater than zero (215). As described above, the TTL field 62 can be used to indicate whether a DTM frame should be terminated by the receiver, i.e., not forwarded by the receiver. When the TTL field 62 value is zero the delay trace module 26 discards the DTM frame (210).

If the TTL field 62 has a value greater than zero, the delay trace module 26 verifies that a DTM egress identifier TLV 59 is present in the DTM frame (FIG. 3C) (220). The DTM egress identifier TLV 59 identifies the MEP that initiated the DTM frame, or the MIP that forwarded the DTM frame. If no DTM egress identifier TLV 59 is present, the delay trace module 26 discards the DTM frame (210). In some embodiments, steps 205-220 are used to validate the DTM frame. For example, the delay trace module 26 successfully validates the DTM frame if delay trace module 26 determines that the receiving ME is on the same MEG level as the ME that transmitted the DTM frame, the TTL field 62 value is greater than zero, and the DTM egress identifier TLV 59 is present. In some embodiments, one or more of the steps 205-220 may be carried out in forwarding hardware of the network device.

After verifying that a DTM egress identifier TLV 59 is present, the delay trace module 26 determines whether the Target MAC address field 66 of the DTM frame matches the ME's own MAC address (225). If so, the ME receiving the DTM frame is intended as the end point of the DTM frame. The delay trace module 26 generates a DTR frame (230) and sends the DTR frame toward the originating MEP (235).

If the Target MAC address field 66 of the DTM frame does not match the ME's own MAC address, the ME may be acting as an MIP that forwards the DTM frame to another ME on the network 10. First, the delay trace module 26 determines whether the Target MAC address field 66 in the DTM frame includes a target MAC address that is associated with a single egress port that is not the same as the ingress port of the ME on which the DTM frame was received. If the egress port is the same as the ingress port, the delay trace module 26 discards the DTM frame (210).

If the egress and ingress ports are not the same, the delay trace module 26 generates a DTR frame (240) and sends the DTR frame toward the originating MEP (245). In addition, the delay trace module 26 verifies that a value of the TTL field 62 is greater than one (250). If the TTL field 62 value is not greater than one, the delay trace module 26 discards the DTM frame (255). If the TTL field 62 value is greater than one, the delay trace module 26 forwards the DTM frame to the next ME on the network 10 by modifying certain fields of the DTM frame (260) and sending the modified DTM frame out the egress port of the ME associated with the target MAC address specified by target MAC address field 66 (265). In some embodiments, the delay trace module 26 modifies several of the DTM fields prior to forwarding the DTM frame to the next ME on the network. For example, prior to forwarding, the delay trace module 26 decrements the value of TTL field 62 by one. The delay trace module 26 also updates the DTM egress identifier with the ME's own egress identifier. In other embodiments, hardware may be used to verify the TTL field 62 and modify the DTM fields prior to forwarding the DTM frame to the next ME on the network.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, or other computer-readable storage media. It should be understood that the term "computer-readable storage media" refers to physical storage media, and not signals, carrier waves, or other transient media.

Various embodiments of the invention have been described. These and other embodiments are within the scope of the following claims.

The invention claimed is:

1. A method of tracing Ethernet frame delay between network devices of a network, the method comprising:

with an originating Maintenance Entity Group (MEG) End Point (MEP) network device, outputting a delay trace message Ethernet frame to a target MEP network device, wherein the delay trace message Ethernet frame indicates an address of the originating MEP and a delay trace message initiation time;

with the originating MEP network device, receiving a first delay trace response Ethernet frame from a MEG intermediate point (MIP) network device positioned along a network path from the originating MEP network device to the target MEP network device, wherein the first delay trace response Ethernet frame is generated in response to the delay trace message Ethernet frame;

wherein the first delay trace response Ethernet frame includes a network address of the MIP network device, the delay trace message initiation time, a delay trace message reception time corresponding to a time that the delay trace message Ethernet frame is received by the MIP network device, and a first delay trace response time corresponding to a first time that the first delay trace response Ethernet frame is output toward the originating MEP network device; and with the originating MEP network device, receiving a second delay trace response Ethernet frame from the target MEP network device, wherein the second delay trace response Ethernet frame is generated in response to the delay trace message Ethernet frame, wherein the second delay trace response Ethernet frame includes a network address of the target MEP network device, the delay trace message initiation time, a delay trace message reception time corresponding to a time that the delay trace message Ethernet frame is received by the target MEP network device, and a second delay trace response time corresponding to a second time that the second delay trace response Ethernet frame is output toward the originating MEP network device.

2. The method of claim 1, further comprising:
calculating delay associated with the network using the first and second delay trace response Ethernet frames,
wherein calculating the delay comprises calculating a first delay between the delay trace message initiation time and the time that the first delay trace response Ethernet frame is received by the originating MEP network device, and calculating a second delay between the delay trace message initiation time and the time that the second delay trace response Ethernet frame is received by the originating MEP network device.

3. The method of claim 2, further comprising calculating a delay associated with a portion of the network between the MIP network device and the target MEG network device by subtracting the first delay from the second delay.

4. The method of claim 2, further comprising:
for each of the first delay and second delay, calculating a processing delay associated with processing the respective delay trace message Ethernet frames and the respective first delay trace response Ethernet frame and the second delay trace response Ethernet frame; and
reducing each of the respective first delay and the second delay by the respective processing delay.

5. The method of claim 1, wherein the delay trace message Ethernet frame includes a transaction identifier.

6. The method of claim 5, further comprising storing the transaction identifier, with the originating MEP, for verifying delay trace response Ethernet frames.

7. The method of claim 6, further comprising, with the originating MEP network device, verifying received delay trace response Ethernet frames by matching the transaction identifier of the delay trace response Ethernet frames to the transaction identifier of the delay trace message Ethernet frame.

8. The method of claim 1, wherein the originating MEP network device, the MIP network device, and the target MEP network device are members of a common MEG.

9. The method of claim 8, wherein a MEG level is identified in the delay trace message Ethernet frame and the delay trace response Ethernet frames.

10. The method of claim 1, wherein the delay trace message Ethernet frame further comprises an address of the target MEP network device.

11. The method of claim 1, wherein a network administrator configures the originating MEP to output the delay trace message Ethernet frame for Ethernet network OAM fault management and performance monitoring.

12. A network device for tracing delay between network devices connected to an Ethernet network, the network device comprising:
an interface configured to send and receive Ethernet frames to and from a network between an originating Maintenance Entity Group (MEG) End Point (MEP) network device and a target MEP network device;
a forwarding engine configured to receive a delay trace message Ethernet frame and determine whether to forward the delay trace message Ethernet frame to a next hop along a path of the network to a target network device, wherein the delay trace message Ethernet frame includes an address of a network device that originated the delay trace message Ethernet frame and a delay trace message initiation time; and
a delay trace module configured to generate a delay trace response Ethernet frame upon receiving the delay trace message Ethernet frame, wherein the delay trace response Ethernet frame includes a network address of the network device, the delay trace message initiation time, a delay trace message Ethernet frame reception time corresponding to the time that the delay trace message Ethernet frame is received by the network device, and a delay trace response time corresponding to a time that the delay trace response Ethernet frame is output from the network device toward the originating MEP network device.

13. The network device of claim 12, wherein the forwarding engine is configured to validate the delay trace message Ethernet frame prior to forwarding the delay trace message Ethernet frame to the next hop.

14. The network device of claim 13, wherein the forwarding engine is configured to forward the delay trace message Ethernet frame to the next hop if the delay trace message Ethernet frame is validated, and to discard the delay trace message Ethernet frame if the delay trace message Ethernet frame is not validated.

15. The network device of claim 11, wherein the forwarding engine is configured to discard the delay trace message Ethernet frame if a MEG level indicated by the delay trace message Ethernet frame is not the same as a MEG level of the network device.

16. The network device of claim 11, wherein the network device comprises a router.

17. A method of tracing layer two (L2) frame delay between network devices, the method comprising:
with an originating Maintenance Entity Group (MEG) End Point (MEP) network device, outputting a delay trace message L2 frame to a target MEP network device, wherein the delay trace message L2 frame indicates an address of the originating MEP and a delay trace message initiation time;
with the originating MEP network device, receiving a first delay trace response L2 frame from a MEG intermediate point (MIP) network device positioned along a network path from the originating MEP network device to the target MEP network device, wherein the first delay trace response L2 frame is generated in response to the delay trace message L2 frame;
wherein the first delay trace response L2 frame includes a network address of the MIP network device, the delay trace message initiation time, a delay trace message reception time corresponding to a time that the delay trace message L2 frame is received by the MIP network device, and a first delay trace response time corresponding to a first time that the first delay trace response L2 frame is output toward the originating MEP network device;
with the originating MEP network device, receiving a second delay trace response L2 frame from the target MEP network device, wherein the second delay trace response L2 frame is generated in response to the delay trace message L2 frame; and
wherein the second delay trace response L2 frame includes a network address of the target MEP network device, the delay trace message initiation time, a delay trace message reception time corresponding to a time that the delay trace message L2 frame is received by the target MEP network device, and a second delay trace response time corresponding to a second time that the second delay trace response L2 frame is output toward the originating MEP network device.

* * * * *